United States Patent
Filias

(10) Patent No.: US 8,565,981 B2
(45) Date of Patent: Oct. 22, 2013

(54) METHOD OF CONTROLLING A BUOYANCY SYSTEM FOR AN AIRCRAFT, AND A CONTROL SYSTEM IMPLEMENTING SAID METHOD

(75) Inventor: Francois-Xavier Filias, Pelissanne (FR)

(73) Assignee: Eurocopter, Marignane Cedex (FR)

( * ) Notice: Subject to any disclaimer, the term of this patent is extended or adjusted under 35 U.S.C. 154(b) by 248 days.

(21) Appl. No.: 13/098,565

(22) Filed: May 2, 2011

(65) Prior Publication Data

US 2011/0276232 A1    Nov. 10, 2011

(30) Foreign Application Priority Data

May 4, 2010 (FR) .................................... 10 01901

(51) Int. Cl.
*B60R 99/00* (2009.01)

(52) U.S. Cl.
USPC .............................................. 701/45; 244/97

(58) Field of Classification Search
USPC ............ 701/45, 14; 244/97, 100 A, 101, 107, 244/17.17, 139, 58, 30, 31, 98, 99, 25; 114/345, 123, 68, 360
See application file for complete search history.

(56) References Cited

U.S. PATENT DOCUMENTS

| | | | |
|---|---|---|---|
| 4,850,551 A * | 7/1989 | Krawetz et al. | 244/97 |
| 6,619,586 B1 * | 9/2003 | Barnes, III | 244/97 |
| 7,156,033 B2 | 1/2007 | Mears et al. | |
| 8,091,826 B2 * | 1/2012 | Voorhees | 244/97 |
| 2010/0004803 A1 | 1/2010 | Manfredi et al. | |

FOREIGN PATENT DOCUMENTS

EP     0869058 A2    10/1998
WO    2009054844 A1    4/2009

OTHER PUBLICATIONS

Xiaotao Wu Claude H. Moog L.A. Marquez Martinez et al., Nonlinear Control of a Buoyancy-Driven Airship, Dec. 16-18, 2009, 48th IEEE Conference on Decision and Control and 28th Chinese Control Conference, 2849-2854.*
Search Report and Written Opinion; Application No. FR 1001901; dated Feb. 7, 2011.

* cited by examiner

*Primary Examiner* — Marthe Marc-Coleman
(74) *Attorney, Agent, or Firm* — Brooks Kushman P.C.

(57) ABSTRACT

A method of controlling a buoyancy system for an aircraft includes: determining the roll angle $\phi$ and the pitching angle $\theta$ of the aircraft; verifying whether $-\phi_R < +\phi_R$ and whether $-\theta_R < \theta < +\theta_R$, where $\phi_R$ and $\theta_R$ are predefined limit angles; if at least one of the angles $\phi$ and $\theta$ is no longer in its above-defined respective range, activating an automatic trigger of the buoyancy system; if the angles $\phi$ and $\theta$ are in their above-defined respective ranges, determining the altitude A of the aircraft; inhibiting the automatic trigger if $A > A_R$, where $A_R$ is a predefined limit altitude; and if $A_R \geq A$, and if at least partial immersion of the aircraft has been detected, activating the automatic trigger.

6 Claims, 2 Drawing Sheets

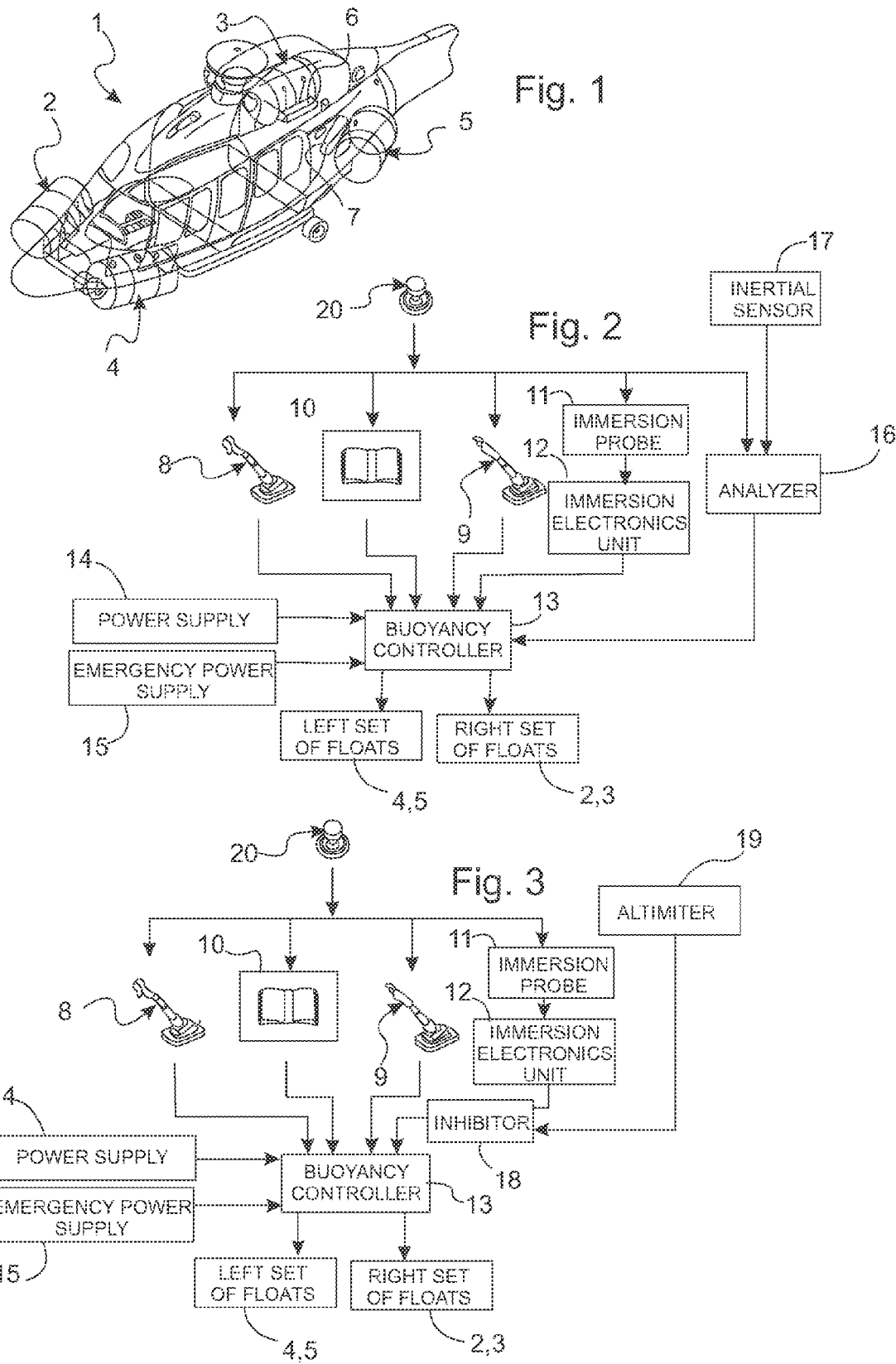

METHOD OF CONTROLLING A BUOYANCY SYSTEM FOR AN AIRCRAFT, AND A CONTROL SYSTEM IMPLEMENTING SAID METHOD

CROSS REFERENCE TO RELATED APPLICATIONS

This application claims the benefit of FR 10 01901 filed on May 4, 2010, the disclosure of which is incorporated in its entirety by reference herein.

BACKGROUND OF THE INVENTION (1) Field of the Invention

The present invention relates to the general technical field of safety systems for aircraft, and in particular for aircraft of the rotorcraft kind, e.g. helicopters.

More particularly, the present invention relates to an emergency buoyancy system and to its control method.

(2) Description of Related Art

Such an emergency buoyancy system is a system that enables the passengers and crew of an aircraft to escape in the event of ditching at sea. All aircraft that need to perform missions of transporting people over areas of sea are fitted with such a system. The system should advantageously keep the aircraft afloat for a duration of at least about five minutes.

An emergency buoyancy system includes leak tight compartments and floats that are inflated either under the control of the pilot and/or the copilot, or else under the control of automatic triggering, in particular by using an immersion detector.

On-board present aircraft, the emergency buoyancy system is triggered only in the event of contacting or impacting water. The buoyancy system must have been primed beforehand using a control button when overflying sea and while advancing at a speed of less than 90 kilometers per hour (km/h). An indicator on the pushbutton lights up when the system is primed, to indicate that the system is operational. So long as the system is not primed, an erroneous manipulation on the control stick therefore cannot trigger inflation of the float.

Pressing on the pushbutton indicator or on a pushbutton on the handle of the control stick makes it possible to trigger inflation of the floats manually.

If the crew is not in a position to actuate the buoyancy system manually, inflation of the floats is triggering automatically by the immersion detector.

Document WO 2008/054401 discloses a system serving to inflate anticrash airbags, taking account of the attitude of the aircraft and of the aircraft approaching the ground at an excessive speed.

Document U.S. Pat. No. 7,156,033 B2 discloses a buoyancy system associated with inhibitor means. The inhibitor means are activated in particular when the aircraft is flying above a certain altitude.

Known emergency buoyancy systems nevertheless present drawbacks. The immersion detectors that are used operate in a manner that can be found to be unsatisfactory in certain situations. This applies in particular when an aircraft of the helicopter type turns over. When the helicopter falls off a deck or a platform at sea, the emergency buoyancy system may fail to trigger, e.g. as a result of slipping progressively and in the absence of any violent impacts against the water or in the absence of the aircraft being fully immersed. The nature of the immersion detector, e.g. based on the orientation of gravity, may also give rise to failures to detect immersion, in the event of the helicopter being upside-down.

Furthermore, undesirable untimely inflation of the floats may occur in flight, e.g. as a result of impacts or of a high level of humidity.

SUMMARY OF THE INVENTION

The object of the present invention is to provide a novel control method for emergency buoyancy systems that avoids the above-mentioned drawbacks.

Another object of the present invention is to provide a novel control method for emergency buoyancy systems, serving to take account of more situations during which triggering of the buoyancy system ought to occur, while avoiding increasing the risk of untimely or erroneous triggering of said system.

Another object of the present invention seeks to provide a novel triggering functional unit for emergency buoyancy systems that avoids the above-mentioned limitations.

The objects given to the present invention are achieved by means of a method of controlling a buoyancy system for aircraft, the buoyancy system including manual trigger means and automatic trigger means, the method consisting in taking account of at least one attitude parameter of the aircraft in order to control the automatic trigger means, and the method consisting in:

a) determining the roll angle $\varphi$ and the pitching angle $\theta$ of the aircraft;

b) verifying whether $-\varphi_R < \varphi < +\varphi_R$ and whether $$-\theta_R < \theta < +\theta_R$$

where $\varphi_R$ and $\theta_R$ are predefined limit angles;

c) if at least one of the angles $\phi$ and $\theta$ is no longer in its above-defined respective range, activating the automatic trigger means;

d) if the angles $\varphi$ and $\theta$ are in their above-defined respective ranges, determining the altitude A of the aircraft;

e) inhibiting the automatic trigger means if $A > A_R$ and returning to step a), where $A_R$ is a predefined limit altitude; and;

f) if $A_R \geq A$, and if at least partial immersion of the aircraft has been detected, activating the automatic trigger means, else returning to step a).

When the buoyancy system is not employed over the sea, steps d) to f) are no longer necessary since the altitude is given relative to an altitude of zero mean sea level (0 MSL). The buoyancy system may then constitute "anticrash" inflatable airbags that operate in accordance with steps a) to c).

In an implementation, the control method in accordance with the method consists in manually priming the buoyancy system.

In an implementation, the control method in accordance with the invention consists in automatically priming the buoyancy system when the aircraft is overflying the sea and when the speed of the aircraft is less than a determined speed Va.

In an implementation, the control method of the invention consists in implementing the steps a) to f) at a determined frequency of 1 hertz (Hz) or 2 Hz, or continuously.

In the event of an altimeter failure, steps d) to f) are no longer valid as for overflying zones remote from the sea.

The objects given to the present invention are also achieved by a triggering functional unit for an emergency buoyancy system for an aircraft in order to implement the control method as specified above, the unit comprising manual trigger means and automatic trigger means including at least one immersion probe with its associated immersion electronics unit, a buoyancy control unit firstly connected to the manual trigger means and to the automatic trigger means, and secondly controlling inflation of floats housed in the aircraft, inflation being provided by cylinders of gas under high pressure, said buoyancy control unit also being connected to at least one electrical power supply, wherein the automatic trigger means comprise firstly analyzer means processing information from an inertial sensor of the aircraft to control the buoyancy control unit as a function of the attitude of the aircraft independently of the action of the immersion probe and secondly an inhibitor connected to an altimeter, said inhibitor filtering commands delivered by the immersion electronics unit to the buoyancy control unit as a function of the altitude of the aircraft.

The objects given to the present invention are also achieved by means of an emergency buoyancy system for an aircraft including a triggering functional unit as specified above, wherein the triggering functional unit includes a manual or automatic system for priming said buoyancy system.

The objects given to the present invention are also achieved by means of a rotorcraft or helicopter type aircraft, including a buoyancy system as specified above. In the event of the helicopter turning upside-down, the control method in accordance with the invention presents the advantage of the buoyancy system being triggered immediately, without waiting for the aircraft to be completely immersed. Indeed, there is no need to wait for information coming from an impact sensor or an immersion sensor, which might be faulty, in order to trigger the buoyancy system.

Another advantage of the control method in accordance with the invention lies in the possibility of inhibiting the trigger means of the buoyancy system while in flight so as to avoid automatic triggering in the event of large disturbances or squalls of wind, even though said system is operational.

Another advantage of the control method in accordance with the invention lies in the simplicity with which it can be implemented.

BRIEF DESCRIPTION OF THE DRAWINGS

The invention and its advantages appear in greater detail from the following description of an embodiment given by way of non-limiting illustration and with reference to the accompanying figures, in which:

FIG. 1 is a fragmentary diagrammatic view of a helicopter fitted with an emergency buoyancy system in accordance with the invention;

FIG. 2 is a block diagram showing a mode of operation of a control system for a buoyancy system that implements the control method in accordance with the invention, corresponding to making the aircraft safe in the event of overturning;

FIG. 3 is a block diagram showing another mode of operation of a control system for a buoyancy system that implements the control method in accordance with the invention, corresponding to making the aircraft safe so as to avoid untimely triggering of the buoyancy system.

Figure 4:
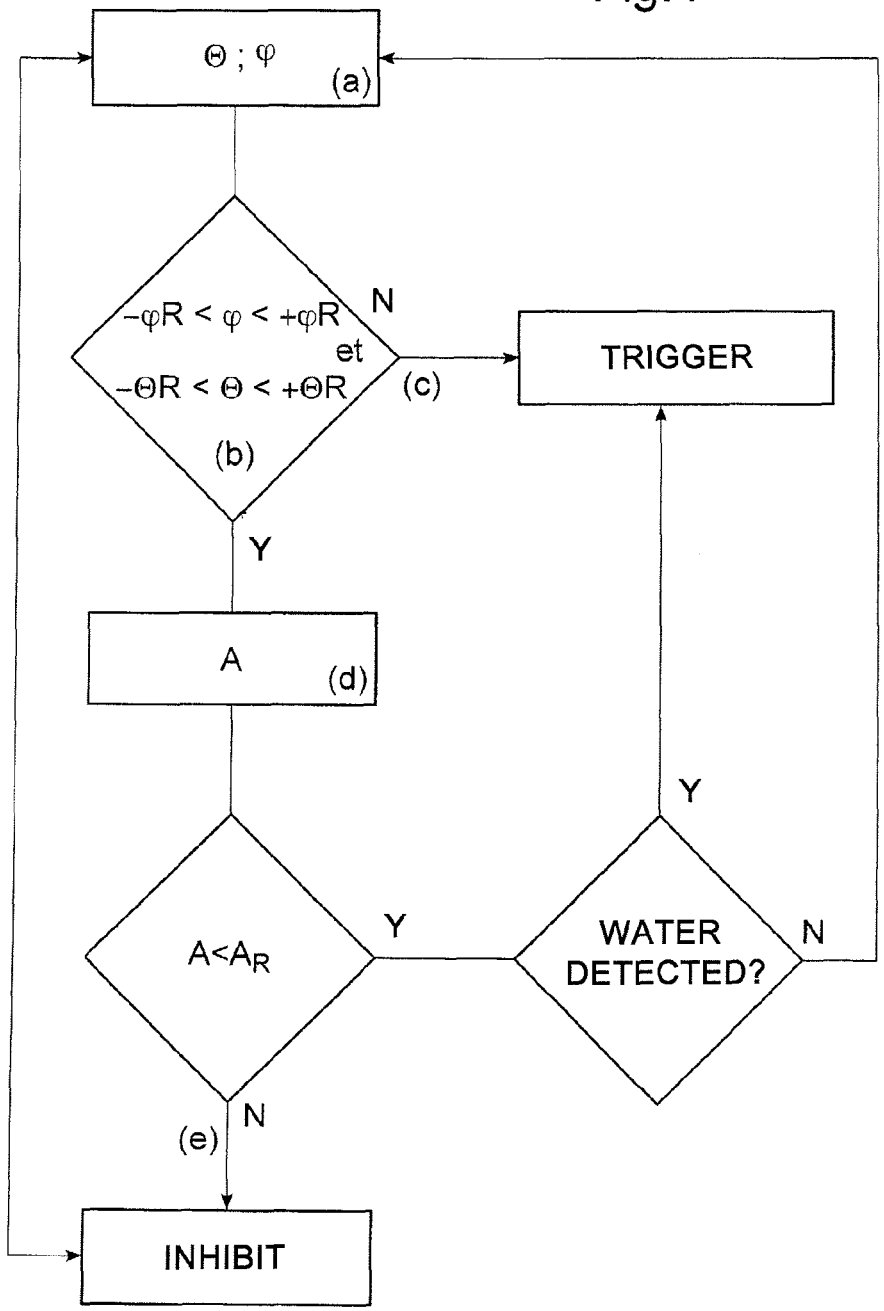
FIG. 4 is a flow chart showing an implementation of the control method in accordance with the invention for a buoyancy system.

Elements that are structurally and functionally identical and that are present in more than one of the figures are given the same numerical or alphanumerical references in each of them.

DETAILED DESCRIPTION OF THE PREFERRED EMBODIMENTS

Below, reference is made more particularly to a helicopter, however any rotorcraft type of aircraft should be considered for application of the invention.

FIG. 1 is a fragmentary diagrammatic view of a helicopter 1 fitted with an emergency buoyancy system in accordance with the invention. The helicopter 1 has a right front float 2, a right rear float 3, a left front float 4, and a left rear float 5, which floats are shown in an inflated state after an emergency buoyancy system has been activated. The right floats 2, 3 are advantageously connected to a first cylinder 6 containing gas under high pressure, and the left floats 4, 5 are advantageously connected to a second cylinder 7 containing gas under high pressure.

The inflatable floats 2, 3, 4, and 5 are arranged in their uninflated state in specific compartments provided in the structure of the helicopter 1.

Connection pipes (not shown) between the cylinders 6 and 7 of gas under high pressure and the inflatable floats 2, 3, 4, and 5, and also means for closing said cylinders of gas under high pressure and means for releasing the gas under pressure (not shown) are also provided.

FIG. 2 shows a mode of operation of a control system for controlling a functional unit for triggering an emergency buoyancy system of the helicopter 1, corresponding by way of example to a system for making the aircraft safe in the event of overturning.

The triggering functional unit comprises manual trigger means including pushbuttons provided on the handles of the control sticks 8 and 9, and a pushbutton indicator 10 provided on the dashboard.

The triggering functional unit also comprises automatic trigger means including at least one immersion probe 11 and an immersion electronics unit 12 associated therewith to shape the measurements from the immersion probe 11 and to deliver control instructions. In general manner, immersion probes, like impact probes, are very well known in themselves, and they are not described in greater detail herein.

The triggering functional unit also comprises a buoyancy control unit 13 firstly connected to the manual trigger means and to the automatic trigger means, and secondly controlling the inflation of the right and left floats 2 & 3 and 4 & 5 installed on the helicopter 1. The buoyancy control unit 13 can thus receive instructions from the control sticks 8 and 9, from the pushbutton indicator 10, or from the immersion electronics unit 12.

The buoyancy control unit 13 is connected to at least one electrical power supply 14, and where appropriate also to an emergency electrical power supply 15.

The automatic trigger means also comprise analyzer means for processing information coming from an inertial sensor 17 of the helicopter 1, of the attitude heading reference system (AHRS) type, in order to activate the buoyancy control unit 13 as a function of the attitude of the helicopter 1, independently of the action or state of the immersion probe 11.

FIG. 3 shows a mode of operation of a control system for a triggering functional unit of an emergency buoyancy system of the helicopter 1, corresponding to making the aircraft safe to avoid untimely triggering of the buoyancy system.

The automatic trigger means include, for this purpose, an inhibitor 18 connected to an altimeter 19 in order to filter commands delivered by the immersion electronics unit 12 to the buoyancy control unit 13 as a function of the altitude of the helicopter 1.

The objects given to the present invention are also achieved by means of an emergency buoyancy system for a helicopter 1, the system including a triggering functional unit as described above.

By way of example, the emergency buoyancy system in accordance with the invention also includes a manual or automatic system 20 for priming said buoyancy system. Once primed, the pushbutton indicator 10 lights up and informs the pilot that the emergency buoyancy system is operational.

FIG. 4 is a flow chart of an example implementation of the method of controlling a buoyancy system, and more particularly of the automatic trigger means of said system.

The control method in accordance with the invention consists in taking account of the attitude of the helicopter 1 in order to control the automatic trigger means.

In a step a), the method consists in determining the roll angle φ and the pitching angle θ of the helicopter 1, e.g. by using the inertial sensor 17.

In a step b), the method consists in verifying whether $-\varphi_R < \varphi < +\varphi_R$ and whether $$-\theta_R < \theta < +\theta_R$$

e.g. using the analyzer means 16. $\varphi_R$ and $\theta_R$ are predefined limit angles respectively in roll and in pitching of about 85°, the normal flight ranges for a helicopter lying in the range −85° to +85°.

In a step c), if at least one of the angles φ and θ is not in its above-defined respective range, the method consists in activating the automatic trigger means. Such a situation corresponds to the helicopter 1 having an abnormal attitude of a kind that can no longer be corrected by the pilot.

In a step d), if the angles φ and θ are within their above-defined respective ranges, the method consists in determining the altitude A of the helicopter 1, e.g. using the altimeter 19.

In a step e), the method consists in inhibiting the automatic trigger means if $A > A_R$ and, in returning to step a).

Thus, so long as the altitude A of the helicopter is higher than a predefined limit altitude $A_R$, e.g. equal to 100 meters (m), the buoyancy system cannot be activated automatically by the immersion and/or impact sensor(s).

In a step f), if $A_R \geq A$ and if at least partial immersion of the aircraft has been detected, the method consists in activating the automatic trigger means. Thus, for an altitude less than or equal to $A_R$, the automatic trigger means are activated only if an immersion in or an impact against water is detected. In the absence of such detection, with the helicopter 1 in a normal attitude, the control method returns to step a).

In an implementation, the control method in accordance with the invention consists in manually priming the buoyancy system using the priming system 20.

In another implementation, the control method in accordance with the invention consists in automatically priming the buoyancy system when the aircraft is overflying the sea and when the speed of the aircraft is less than a determined speed Va, e.g. equal to 90 km/h.

In another implementation, the control method in accordance with the invention consists in implementing steps a) to f) at a determined frequency, e.g. at 1 Hz to 2 Hz, or continuously.

In the event of the altimeter failing, inhibition is no longer activated, leaving the pilot free to optionally activate the buoyancy system.

Naturally, the present invention may be subjected to numerous variations as to its implementation. Although several embodiments and/or implementation steps are described above, it will readily be understood that it is not possible to identify exhaustively all possible embodiments and/or steps. It is naturally possible to envisage replacing any of the means described or any of the steps described by equivalent means or by an equivalent step without going beyond the ambit of the present invention.

What is claimed is:

1. A method of controlling a buoyancy system for an aircraft, the buoyancy system including manual trigger means and automatic trigger means and a controller configured to cause floats to inflate in response to either trigger means being activated, the method comprising taking account of at least one attitude parameter of the aircraft in order to control the automatic trigger means, and the method further comprising:
   a) determining, with an inertial sensor, the roll angle φ and the pitching angle θ of the aircraft;
   b) verifying, with an analyzer in communication with the inertial sensor, whether $-\varphi_R < \varphi < +\varphi_R$ and whether $$-\theta_R < \theta < +\theta_R$$

where $\varphi_R$ and $\theta_R$ are predefined limit angles;
   c) if at least one of the angles φ and θ is no longer in its above-defined respective range, activating the automatic trigger means to thereby cause the controller to cause the floats to inflate;
   d) if the angles φ and θ are in their above-defined respective ranges, determining, with an altimeter, the altitude A of the aircraft;
   e) inhibiting, with an inhibitor in communication with the altimeter, the automatic trigger means if $A > A_R$ and returning to step a), where $A_R$ is a predefined limit altitude; and
   f) if $A_R \geq A$ and if at least partial immersion of the aircraft has been detected with an immersion detector, activating the automatic trigger means to thereby cause the controller to cause the floats to inflate, else returning to step a).

2. The method according to claim 1, further including manually priming the buoyancy system.

3. The method according to claim 1, further including automatically priming the buoyancy system when the aircraft is overflying the sea and when the speed of the aircraft is less than a determined speed Va.

4. The method according to claim 1, comprising implementing the steps a) to f) at a determined frequency of 1 Hz or 2 Hz, or continuously.

5. An emergency buoyancy system for an aircraft, the system comprising:
   manual trigger means and automatic trigger means including an immersion probe;
   a buoyancy controller connected to the manual trigger means and to the automatic trigger means and controlling inflation of floats housed in the aircraft, inflation being provided by cylinders of gas under high pressure, in response to either of the trigger means being activated, said controller also being connected to at least one electrical power supply;
   an inertial sensor configured to determine the roll angle φ and the pitching angle θ of the aircraft;
   an analyzer configured to verify whether $-\varphi_R < \varphi < +\varphi_R$ and whether $-\theta_R < \theta < +\theta_R$, where $\varphi_R$ and $\theta_R$ are predefined limit angles;
   wherein the automatic trigger means is configured to activate to thereby cause the controller to cause the floats to inflate when at least one of the angles φ and θ is not in its above-defined respective range;
   an altimeter configured to determine the altitude A of the aircraft when the angles φ and θ are in their above-defined respective ranges; and
   an inhibitor configured to inhibit the automatic trigger means when $A > A_R$, where $A_R$ is predefined limit altitude;
   wherein the automatic trigger means is further configured to activate to thereby cause the controller to cause the floats to inflate when $A_R \geq A$ and at least partial immersion of the aircraft has been detected by the immersion probe.

6. The system of claim 5 wherein the aircraft is a rotorcraft or helicopter type aircraft.

* * * * *